UNITED STATES PATENT OFFICE.

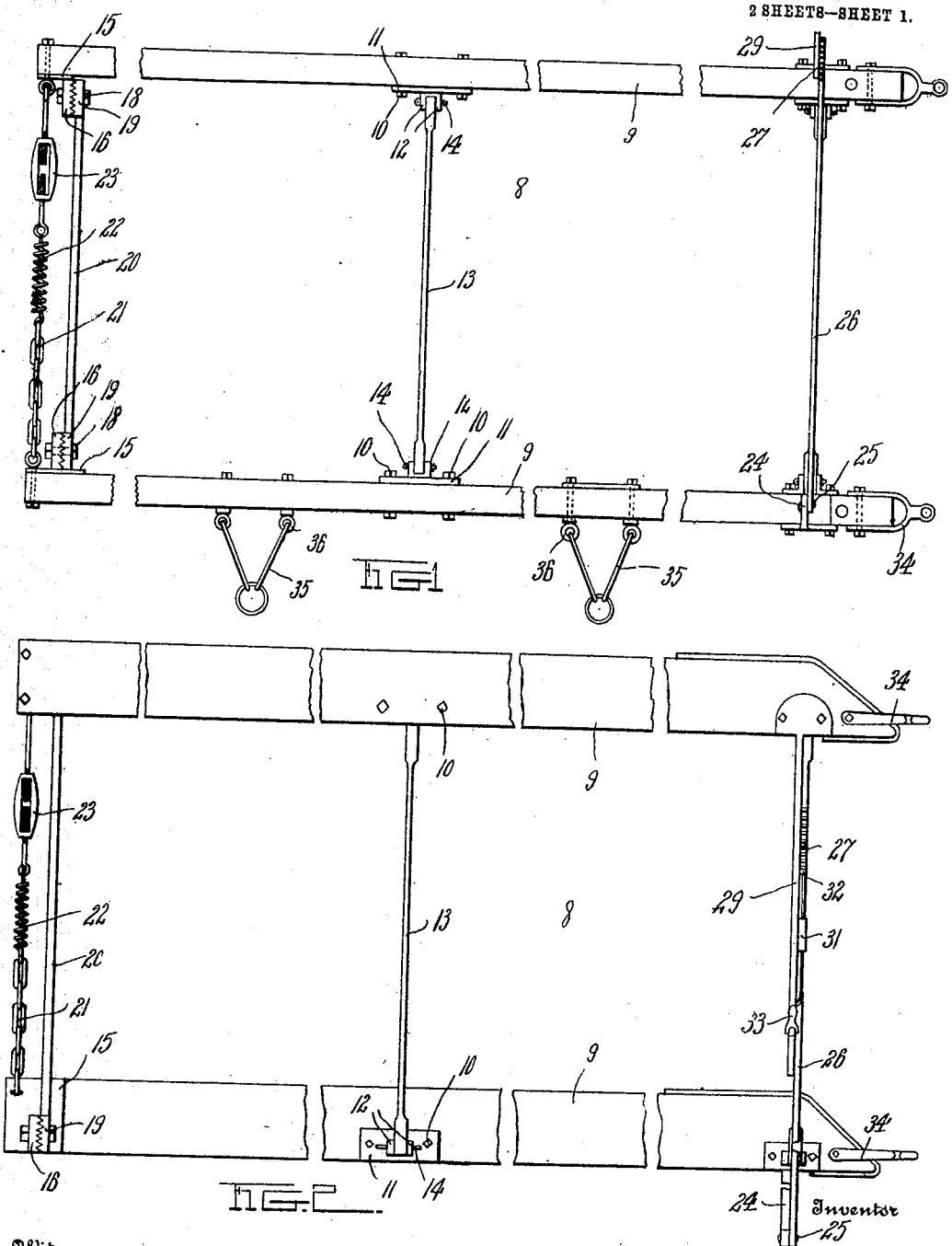

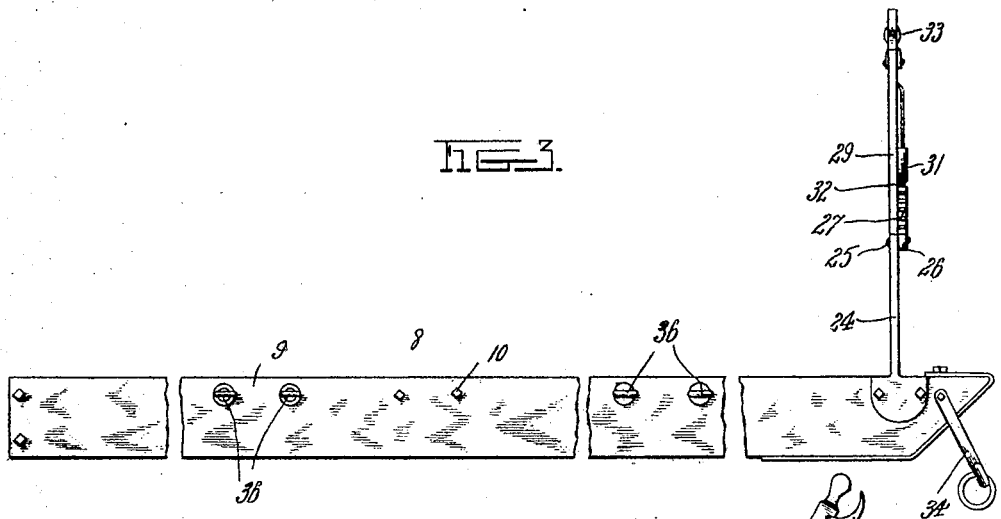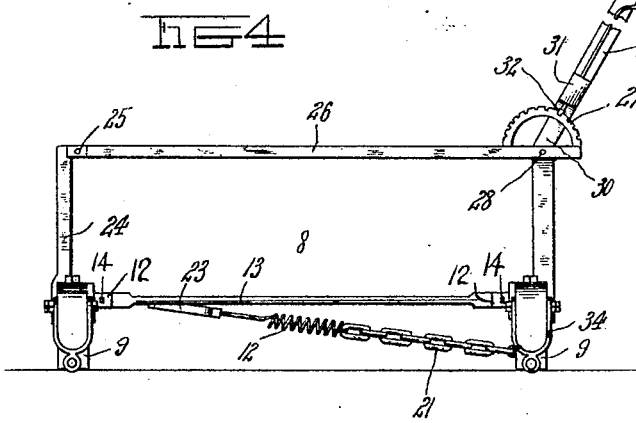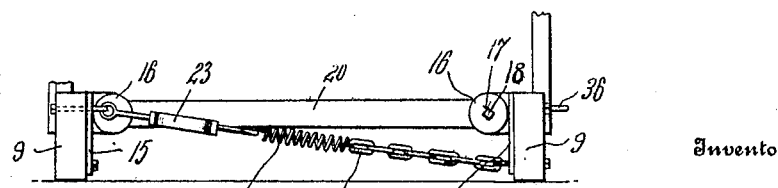

ARTHUR C. NEWCOMER, OF NEWBURG, IOWA.

COMBINED HARROW-TRANSPORT AND CLOD-CRUSHER.

No. 916,478.

Specification of Letters Patent.

Patented March 30, 1909.

Application filed September 17, 1908. Serial No. 453,441.

*To all whom it may concern:*

Be it known that I, ARTHUR C. NEWCOMER, a citizen of the United States, residing at Newburg, in the county of Jasper, State of Iowa, have invented certain new and useful Improvements in Combined Harrow-Transports and Clod-Crushers; and I do hereby declare the following to be a full, clear, and exact description of the invention, such as will enable others skilled in the art to which it appertains to make and use the same.

The invention relates to a combined harrow-transport and clod crusher.

The primary object of the invention is the provision of a combined harrow-transport and clod crusher comprising spaced side runners pivotally united to each other, means having connection with said runners whereby they can be shifted from vertical to various angular positions so that the same may be utilized as a clod crusher by being dragged over the ground by draft animals and means for locking the runners in their adjusted position and when the latter are vertically disposed with respect to each other the same are adapted to support a harrow or other agricultural implement for conveying or transporting the same from one locality to another in a field without the necessity of taking apart the harrow or other machine.

Another object of the invention is the provision of a combined harrow-transport and clod crusher adapted to be transposed from a means to transport and convey harrows or other implements from one field to another to a clod crusher which can be dragged over the ground by draft animals to break and pulverize the broken earth.

The invention is simple in construction, thoroughly efficient in operation, readily and easily adjusted to convert the same from a transporter to a clod crusher, and inexpensive in the manufacture.

With these and other objects in view the invention consists in the construction, combination and arrangement of parts as will be hereinafter more fully described and as illustrated in the accompanying drawings which disclose the preferred form of embodiment of the invention.

It is to be understood that minor changes, variations and modifications may be resorted to such as come properly within the scope of the claims hereunto appended without departing from the spirit of the invention.

In the drawings; Figure 1 is a top plan view of the invention with the runners in a vertical position to form a transporter. Fig. 2 is a similar view with the runners shifted to a collapsed or angular position. Fig. 3 is a side view of the invention. Fig. 4 is a front end view. Fig. 5 is a rear end view.

Similar reference characters indicate corresponding parts throughout the several views in the drawings.

In the drawings, the numeral 8 designates generally the combined harrow-transport and clod crusher which comprises spaced parallel side sections forming sled runners 9 which may be of wood or any other suitable material and shod or not as desirable. At suitable distances throughout the length of the runners 9 and secured by fasteners such as bolts 10 to the inner faces of the latter are plates 11 having spaced perforated ears 12 between which are mounted the perforated ends of cross connecting bars 13 the latter being pivotally connected to said ears by split cotter pins 14 whereby the said cross bars can be readily detached from the runners.

Near the rear ends of the runners 9 and fixed to the inner faces thereof are plates 15 which extend throughout a greater portion of the depth of said runners and are provided with right angularly disposed inwardly directed annular ratchet heads 16 containing central threaded openings 17 receiving threaded fasteners 18 carried by annular ratchet head extremities 19 of an adjusting bar 20 extending transversely across and between the runner and which ratchet head on the adjusting bar and plates connected to the runner are adapted to be brought into locked position by the fasteners 18 so as to permit angular adjustment of the runner bars from a substantially vertical to various angular positions and to lock the same in such positions.

Secured to one of the plates 15 adjacent the adjusting bar is a chain 21 the latter having secured at its free end a tensioned resetting spring 22 carrying a turn buckle connection 23 with the other plate 15 which latter has connection with the plate at a point near the upper edge of one runner while the chain has connection with the other plate near the lower edge of the other runner so as to act upon said runners to aid in bringing the same in a vertical position when being adjusted.

Rising from one of the runners near the front end thereof is a short standard 24 having its upper end pivotally connected as at 25 with a shifting rod 26 transversely disposed and carrying at its free end a toothed segment or quadrant 27 the latter centrally pivoted as at 28 to a throw lever 29 which is slightly inclined as at 30 and the lower end of which is fixed to the other runner 9 directly opposite the said standard. Carried by the throw lever 29 is a housing 31 in which is mounted a spring controlled locking pin 32 which is adapted to engage the toothed segment and has connection with a release lever 33 pivoted to the upper end of the throw lever.

To angularly adjust the runners 9 the adjusting bar is released and the throw lever is manually operated so as to shift or move the shifting rod 26 which will simultaneously move the said runners to any desired angular position and held therein by the locking pin 32 engaging the toothed segment. After the desired adjustment of the runner has been accomplished the adjusting bar 20 is then brought to a locked position through the medium of the ratchet heads.

To the forward extremities of the runners 9 are connected eye clevises 34 for detachably receiving draft couplings 35 to which draft animals may be attached for moving the runners across the field. Also at suitable intervals throughout a portion of the length of one of the runners 9 and connected thereto at its outer face are a plurality of rings 36 for receiving the draft couplings 35 whereby draft animals can be connected to one side of the runners when the same are angularly adjusted to drag them across a field for use as a clod crusher.

To convey a harrow machine or other agricultural implement from one field to another the runners 9 are collapsed by throwing the throw lever which will automatically shift the said runners to an inclined angular position whereby a harrow machine or other implement can run upon the said runners and then the throw lever is again actuated to bring the runners into a substantially vertical position and locked therein by the adjusting bar and draft animals are applied to the clevises at the front of the runners so that the same can be pulled over the ground.

To use the runners as a clod crusher the said runners are shifted from a substantially vertical position to any desired angular position and locked therein then draft animals are attached to one side runner so that the device can be dragged across the field so as to crush and pulverize the earth.

What is claimed is—

1. In a combined harrow-transport and clod crusher, spaced runners, cross bars pivotally connecting said runners, means to lock the runners in angularly adjusted positions and means for shifting the runners from vertical to various angular positions.

2. In a combined harrow-transport and clod crusher, spaced runners, cross bars pivotally connecting said runners, means to lock the runners in angularly adjusted positions, means for shifting the runners from vertical to various angular positions, eye clevises carried at the front end of the runners, and draft rings connected to one runner at the side thereof.

3. A device of the class described comprising a pair of spaced runners, cross bars pivotally connected to the inner face of each runner for uniting the same, ratchet heads projecting inwardly from the runners near the rear ends thereof, an adjusting bar having ratchet extremities engaging the ratchet head to lock the runners in various angular positions, and throw lever connections between the runners for adjusting the same.

4. A device of the class described comprising a pair of spaced runners, cross bars pivotally connected to the inner face of each runner for uniting the same, ratchet heads projecting inwardly from the runners near the rear ends thereof, an adjusting bar having ratchet extremities engaging the ratchet head to lock the runners in various angular positions, a yieldable connection between the runners to assist the same in assuming a vertical position, a standard rising from one of said runners, a rod having one end pivotally connected thereto, a toothed segment on the free end of said rod, a throw lever rising from the other runner and pivotally connected to the segment, and a release locking pin carried by the throw lever and adapted to engage the teeth of the segment.

In testimony whereof, I affix my signature, in presence of two witnesses.

ARTHUR C. NEWCOMER.

Witnesses:
  Mrs. A. C. NEWCOMER,
  CHAS. NEWCOMER.